United States Patent
Pantelias et al.

(10) Patent No.: US 7,577,129 B2
(45) Date of Patent: Aug. 18, 2009

(54) SUPPORTING MULTIPLE LOGICAL CHANNELS IN A PHYSICAL INTERFACE

(75) Inventors: Niki R Pantelias, Duluth, GA (US); Yushan Lu, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 838 days.

(21) Appl. No.: 10/272,371

(22) Filed: Oct. 17, 2002

(65) Prior Publication Data

US 2004/0076181 A1 Apr. 22, 2004

(51) Int. Cl.
H04L 12/56 (2006.01)
(52) U.S. Cl. ............... 370/347; 370/421; 370/442; 725/95; 725/111; 725/144
(58) Field of Classification Search .......... 370/347, 370/420, 421, 440, 441, 442; 725/95, 111, 725/144
See application file for complete search history.

(56) References Cited

U.S. PATENT DOCUMENTS

| | | | | |
|---|---|---|---|---|
| 5,546,391 | A * | 8/1996 | Hochschild et al. | 370/413 |
| 6,742,187 | B1 * | 5/2004 | Vogel | 725/126 |
| 6,940,874 | B2 * | 9/2005 | Ruszczyk et al. | 370/516 |
| 7,050,419 | B2 * | 5/2006 | Azenkot et al. | 370/347 |
| 7,336,680 | B2 * | 2/2008 | Sorenson et al. | 370/468 |
| 7,349,730 | B2 * | 3/2008 | Ein-Gal | 600/427 |
| 7,426,744 | B2 * | 9/2008 | Denney et al. | 725/111 |
| 7,496,110 | B1 * | 2/2009 | Beser | 370/458 |
| 2002/0061012 | A1 | 5/2002 | Thi et al. | 370/352 |
| 2002/0101883 | A1 * | 8/2002 | Ruszczyk et al. | 370/503 |

FOREIGN PATENT DOCUMENTS

| | | |
|---|---|---|
| EP | 1 235 402 A2 | 8/2002 |
| WO | W0 00/48420 | 8/2000 |

OTHER PUBLICATIONS

Cable Television Laboratories, "Data-Over-Cable Service Interface Specifications: Radio Frequency Interface Specification, SP-RFIv1.1-I07-010829", Seventh Interim Release, Aug. 29, 2001.*

(Continued)

*Primary Examiner*—Hassan Kizou
*Assistant Examiner*—Brian O Connor
(74) *Attorney, Agent, or Firm*—Sterne, Kessler, Goldstein & Fox P.L.L.C.

(57) ABSTRACT

A supervisory communications system (such as, a headend cable modem termination system) manages communications with a plurality of remote communications devices (such as, a cable modem). The supervisory system enables each of its physical channels to have multiple logical channels, with each logical channel having differing channel parameters or operating characteristics. As a result, different types of communication devices are permitted to coexist on the same physical spectrum. In other words, a communications device using, for example, spread spectrum modulation technologies require different operating characteristics than a communications device using, for example, time division multiplexing technologies. Although physical layer transmissions from these communications devices are not compatible, the present invention provides methodologies and/or techniques that define multiple logical channels that allow these communications devices to share the same physical spectrum of a transmission medium (such as, a HFC cable plant, wireless path, etc.) and send upstream transmissions to a single upstream receiver.

8 Claims, 8 Drawing Sheets

OTHER PUBLICATIONS

Cable Television Laboratories, "Data-Over-Cable Service Interface Specifications: Radio Frequency Interface Specification, SP-RFIv1.1-I07-010829", Seventh Interim Release, Aug. 29, 2001, additional pages cited.*

"CableLabs® Achieves Industry 'First' with Certification for DOCSIS™ 2.0" [online], CableLabs® Press Release [retrieved on Feb. 6, 2003]. Retrieved from the Internet: <URL: http://www.cablelabs.com/news/pr/2002/02_pr_docsis_cw24_121902.html> (3 pages).

"Docsis 2.0 More Throughput for All" [online], CED Magazine (Jun. 2002), Reed Business Information [retrieved on May 21, 2003]. Retrieved from the Internet: <URL: http://www.cedmagazine.com/ced/2002/0602/06wc.htm> (5 pages).

"Data-Over-Cable Service Interface Specfications, Radio Frequency Interface Specification, SP-RFIv2.0-103-021218," Cable Television Laboratories, Inc. (Dec. 18, 2002), pp. i-xiii, 16, 20, 73-74, 107, 109-110, 132-133, 179-180, 190-191, 416, 437, and 439-440.

European Search Report from Appl. No. EP 03 02 3446, completed Apr. 13, 2004, 3 pages.

* cited by examiner

SUPPORTING MULTIPLE LOGICAL CHANNELS IN A PHYSICAL INTERFACE

BACKGROUND OF THE INVENTION

1. Field of the Invention

The present invention relates generally to communications networking, and more specifically, to modulating bandwidth in a communications network.

2. Related Art

Conventional cable communications systems deploy a cable modem headend that manages communications with a plurality of cable modems. The headend defines the upstream operating characteristics that enable the cable modems to send carrier signals upstream to the headend. The upstream may consist of multiple channels that can be assigned to the cable modems. These channels are separated from each other by operating at different frequencies.

One or more cable modems use a designated frequency channel to transmit a carrier signal carrying requests and/or data to the headend. The headend receives the upstream signal at a demodulator that interfaces with the physical spectrum interconnecting the cable modems with the headend (i.e., demodulator). The demodulator recovers the underlying requests and/or grants from the carrier signal and forwards this information to a media access controller (MAC) for additional processing.

A headend demodulator conventionally allows a single "channel" to be received from the physical spectrum of a physical plant (such as, a hybrid fiber-coaxial cable plant). In other words, if the upstream consists of multiple channels, a separate demodulator must be coupled to the headend MAC to receive each channel. Therefore, the headend establishes the operating characteristics of each physical spectrum of a physical plant (e.g., HFC plant) to allow a single channel to be received at a single demodulator. Although the physical spectra can be partitioned into channels that are separated from each other by frequency, the center frequency and symbol rate for each channel must be defined in such a way that the channel's spectrum does not overlap (or minimally overlaps in a way that can be corrected with equalization) the spectra of other channels on the same physical plant.

In other words, if the headend communicates with cable modems requiring differing operating characteristics (e.g., center frequency, symbol rates, modulation standards, etc.), a separate demodulator must be provided for each of the separate channels having different operating characteristics. Similarly, if one cable modem uses time division multiple access (TDMA) modulation to send upstream bursts in a TDMA minislot, and a second cable modem uses code division multiple access (CDMA) modulation to send upstream bursts in a CDMA frame, a separate demodulator must be provided to interface with the CDMA and TDMA channels.

Therefore, a protocol for managing upstream properties is needed to address the above problems.

SUMMARY OF THE INVENTION

The present invention solves the above problems by enabling a single burst receiver communicating with a single physical interface in a media access controller (MAC) to receive upstream bursts from a plurality of logical channels on a single segment of physical spectrum of a physical plant (e.g., a terrestrial cable, a wireless path, etc.). Each logical channel is defined to support differing operating characteristics and/or physical parameters from each other. The operating characteristics include symbol rate, center frequency, FEC parameters to be used for various burst types, transmission modulation and/or multiple access standards, and/or the like.

A supervisory communications system (such as, the cable modem termination system of a cable system headend) defines the operating characteristics by constructing upstream channel descriptor (UCD) messages, and broadcasting the UCD messages downstream to a plurality of remote communications devices (such as, a cable modem). The cable modems utilize the UCD messages to configure their upstreams. As such, one cable modem can configure its upstream to transmit bursts in a time division multiple access (TDMA) minislot. A second cable modem can configure its upstream to transmit bursts in a synchronous code division multiple access (S-CDMA) frame. These modulation techniques require different physical layer characteristics and, hence, are not compatible. The present invention enables the TDMA logical channel from the first cable modem and the S-CDMA logical channel from the second modem to share the same physical spectrum and send upstream bursts to the same upstream burst receiver.

The supervisory communications system also prepares and sends MAP messages to the cable modems. The MAP messages apportion upstream bandwidth to the cable modems. In other words, the MAP messages assign grant opportunities or slots (e.g., minislots, frames, etc.) for each cable modem to send an upstream burst in accordance with the operating characteristics set in the UCD messages. In an embodiment, a software application, coupled to the supervisory communications system, prepares the MAP messages and forwards the MAP messages to the MAC, which is also a component of the supervisory communications system. The MAC enables the MAP messages to be sent downstream to the cable modems. However, the MAC also extracts and parses the MAP messages for burst information to be delivered to an upstream burst receiver or demodulator.

In embodiments of the present invention, MAP messages for all logical channels that share a physical channel are parsed. The MAP messages are translated to obtain information elements that enable the upstream demodulator to anticipate burst arrivals. These elements also enable the demodulator to anticipate burst arrivals from logical channels sharing the same physical channel. Conventional systems would require separate physical receivers, each receiving bursts associated with a single logical channel, to support the logical channel concept. However, the present invention provides methodologies and/or techniques that permit a single physical receiver or demodulator to receive bursts from multiple logical channels on a common physical path.

The MAP elements are combined into a single time-ordered stream, using a common timebase that transcends the differing slot counts that may be found on each logical channel. Upon delivery to the demodulator, the MAP elements permit the demodulator to know what type of burst will be received, when the burst will be received, and the duration of that burst. The demodulator is also able to discern in advance, the operating characteristics of the logical channel carrying the incoming bursts.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

I. System Overview
II. Logical Upstream Channels
III. Operational Flow for Supplying MAPs to Burst Receiver
IV. System Implementation of Mapping Logical Channels
V. Exemplary System Implementation I. System Overview The present invention enables multiple logical channels to be received by a single burst receiver or demodulator with each logical channel having different channel parameters or operating characteristics. As a result, different types of communication devices (such as, cable modems) are permitted to coexist on the same physical spectrum. In other words, a communications device using, for example, spread spectrum modulation technologies require different channel parameters or operating characteristics than a communications device using, for example, time division multiplexing technologies. Therefore, physical layer transmissions from these communications devices are not compatible. The present invention provides methodologies and/or techniques that allow these communications devices to share the same physical spectrum of a transmission medium (such as, a cable plant) using a single burst receiver.

Figure 1:
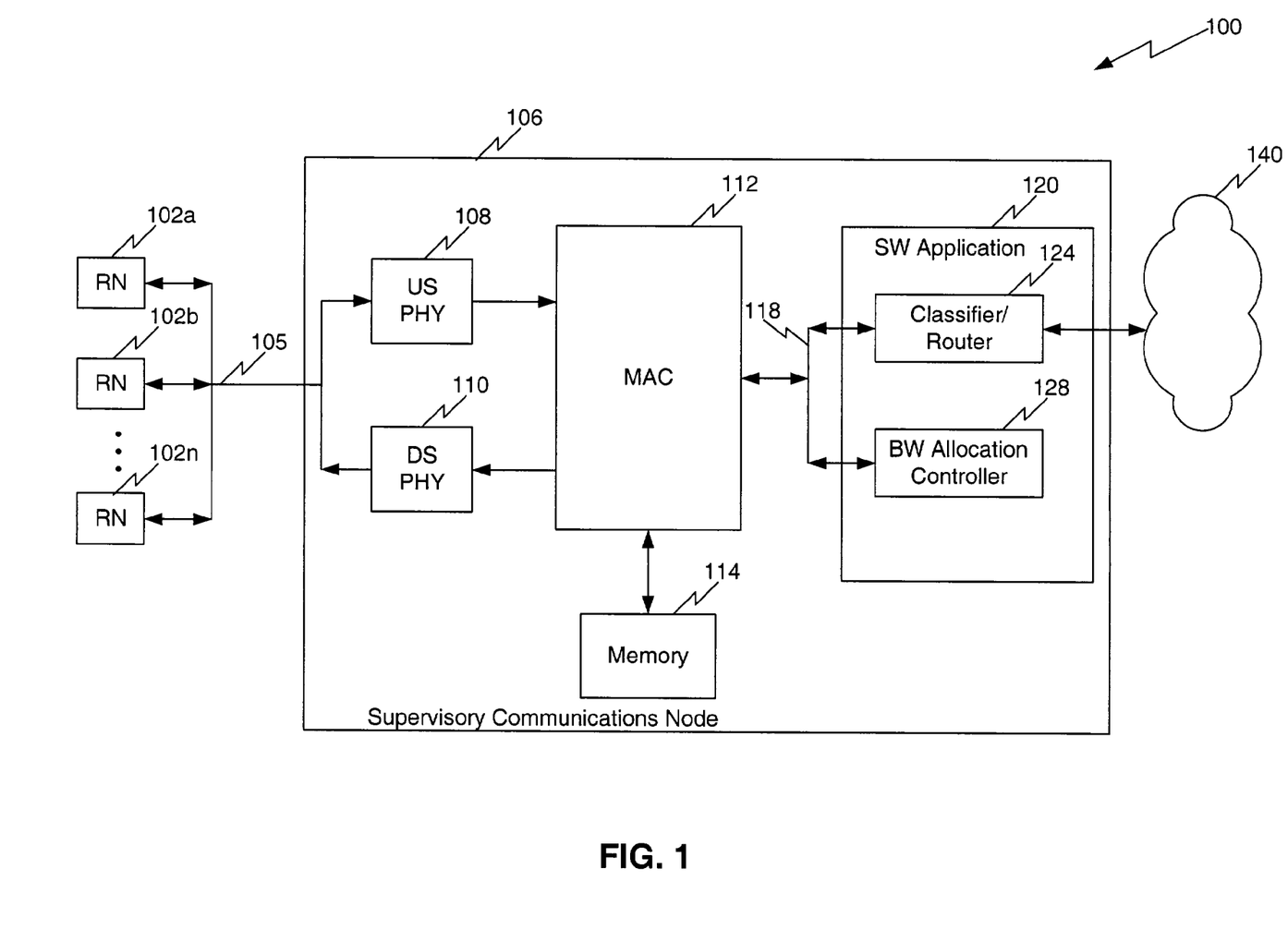
FIG. 1 illustrates a voice and data communications management system according to an embodiment of the present invention.

FIG. 1 illustrates a voice and data communications management system 100 according to an embodiment of the present invention. System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. Supervisory communications node 106 manages upstream modulation and arbitrates bandwidth among remote communications nodes 102. As described in greater detail below, supervisory communications node 106 establishes the upstream slot structure and allocates upstream bandwidth by sending, for example, an upstream channel descriptor (UCD) message and MAP messages, respectively, to remote communications nodes 102. Supervisory communications node 106 also uses the MAP messages and slot count values to anticipate burst arrivals from remote communications nodes 102. In an embodiment, the UCD and MAP messages are defined by the CableLabs® Certified™ Cable Modem project (formerly known as Data Over Cable Service Interface Specification (DOCSIS™)), which specifies the interface requirements for cable communications systems.

In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem or a part thereof. In another embodiment, supervisory communications node 106 is a CMTS and at least one remote communications node 102 is part of a television set-top box.

As part of a cable modem, remote communications node 102 is configurable to transport one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID is used to identify the remote communications node or a general flow from the remote communications node 102, and one or more other SIDS can be used to carry other specific flows, such as phone calls, video streams, messaging, video-conferencing, or the like.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art(s).

The upstream represents all communications from remote communications nodes 102 towards supervisory communications node 106. The upstream is divided into one or more upstream channels. Each upstream channel carries bursts of packets from remote communications nodes 102 to supervisory communications node 106. In the upstream, each channel is broken into multiple assignable slots, and remote communications nodes 102 send a burst signal in an assigned slot. As discussed above, the slot structure is defined and assigned by supervisory communications node 102.

As shown in FIG. 1, an embodiment of supervisory communications node 106 includes an upstream physical layer demodulator (US PHY) 108, a downstream physical layer modulator (DS PHY) 110, a media access controller (MAC) 112, a memory 114 and a software application 120. US PHY 108 forms the physical layer interface between supervisory communications node 106 and the upstream channels of internodal infrastructure 105. Hence, US PHY 108 receives and demodulates all bursts from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 modulates and/or formats the information for downstream transmission.

MAC 112 receives the upstream signals from US PHY 108 or provides the downstream signals to DS PHY 110, as appropriate. MAC 112 operates as the lower sublayer of the data link layer of supervisory communications node 106. In embodiments, MAC 112 supports fragmentation, concatenation, payload header suppression/expansion, and/or error checking for signals transported over the physical layer (i.e., internodal infrastructure 105).

Memory 114 interacts with MAC 112 to store the signals as they are processed by MAC 112. Memory 114 also stores various auxiliary data used to support the processing activities. Such auxiliary data includes security protocols, identifiers, rules, policies, and the like, as described in greater details below.

MAC 112 is connected to software application 120 over bus 118, which is a convention bidirectional bus. Software application 120 operates on one or more processors (or hardware assist devices, such as a field-programmable gate array (FPGA) or application-specific integrated circuit (ASIC)) to receive control messages, voice, and/or data from MAC 112 and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN), wide area networks (WAN), and/or optical networks (such as, an organization's intranet, local internets, the global-based Internet (including the World Wide Web (WWW)), virtual private networks, and/or the like). As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

II. Logical Upstream Channels

As discussed, internodal infrastructure 105 represents the physical spectra between supervisory communications node 106 and a plurality of remote communications nodes 102. Internodal infrastructure 105 provides multiple segments of physical spectrum, each of which supports multiple remote communications nodes 102. Conventionally, a single segment of spectrum is associated with a single channel, and the operating characteristics for all nodes on the same channel must be substantially identical. However, with the use of logical channels, the present invention enables different channels with different operating characteristics to share the same burst receiver.

Figure 2:
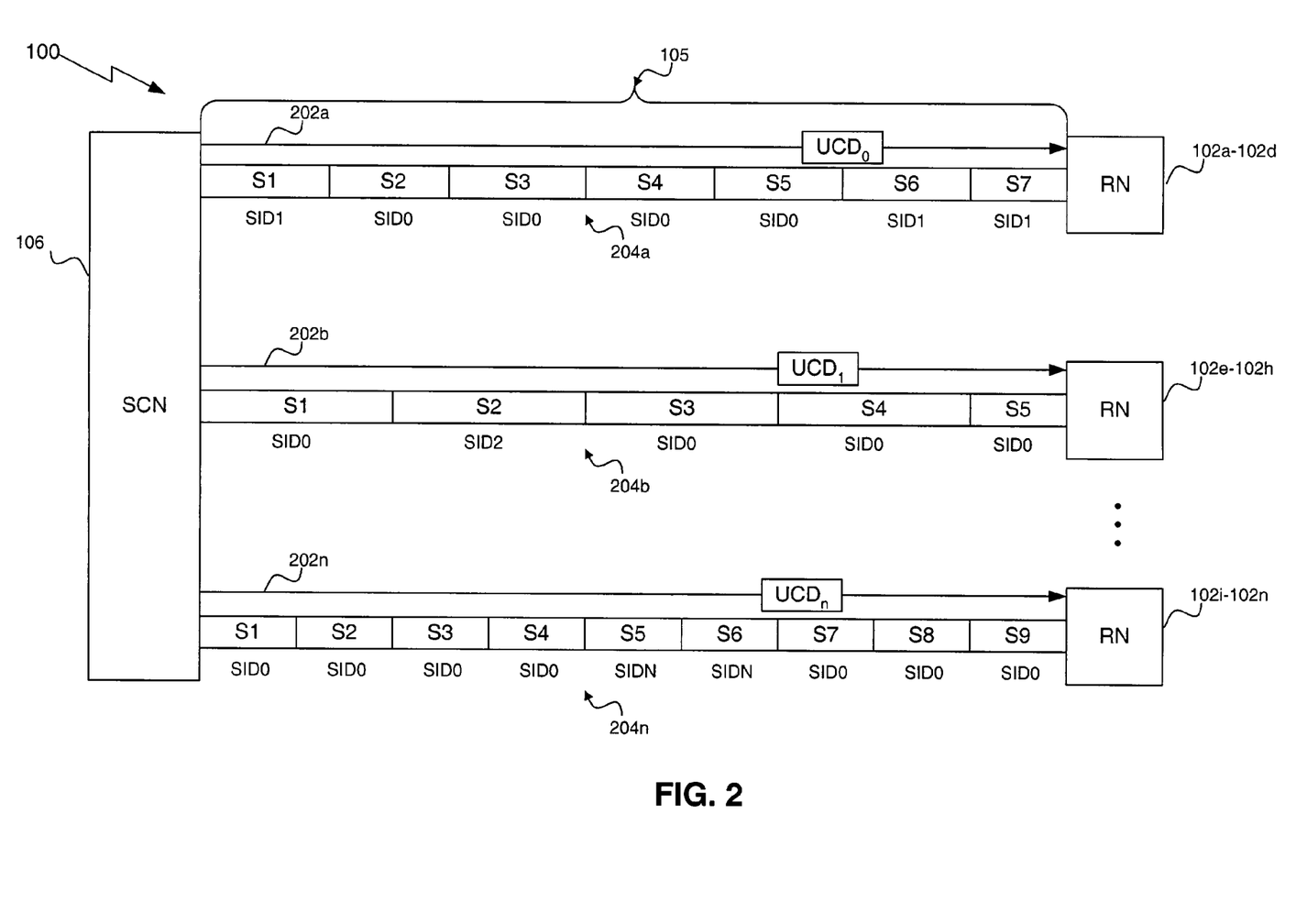
FIG. 2 illustrates a voice and data communications management system according to another embodiment of the present invention.

The upstream represents all communications from remote communications nodes 102 towards supervisory communications node 106. The upstream is divided into one or more upstream channels. Each upstream channel carries bursts of packets from remote communications nodes 102 to supervisory communications node 106. In the upstream, each channel is broken into multiple assignable slots, and remote communications nodes 102 send a burst signal in an assigned slot. As discussed above, the slot structure is defined and assigned by supervisory communications node 106.

Upstream channels 204a-204n are partitioned into multiple assignable slots (shown as S1, S2, S3, etc. for each upstream channel 204a-204n). Each slot (e.g., S1, S2, S3, etc.) is assigned to a SID or similar identifier, as described above. The SID enables each remote communications node 102 to send a burst signal in an assigned slot (i.e., according to the SID identifier) to supervisory communications node 106.

Supervisory communications node 102 (e.g., a headend CMTS in a cable system) defines the properties, operating characteristics, and/or parameters for governing upstream communications with each remote communications node 102 (e.g., CPE devices, such as cable modems in a cable system). In an embodiment, a UCD message (shown as $UCD_0$, $UCD_1$, and $UCD_n$) is prepared and broadcast to all remote communications nodes 102. A UCD message provides instructions that, in essence, partition the upstream into multiple paths, regions, or channels (i.e., upstream channels 204a-204n). A UCD message also contains an arbitrary 8-bit "channel ID" which is unique for a designated channel.

In FIG. 2, all remote communications nodes 102 are allocated a designated upstream path (i.e., upstream channel 202a-202n) to supervisory communications node 106. A group of remote communications nodes 102 generally share the same upstream path (i.e., upstream channels 204a-204n). As shown, remote communications nodes 102a-102d share upstream path 204a, remote communications nodes 102e-102h share upstream path 204b, and remote communications nodes 102i-102n share upstream path 204n. Additionally, each remote communications node 102 can have one or more identifiers (i.e., SID, primary SID, etc., as described above) that enable transmissions in the slots assigned to the respective identifier.

MAC 112 is connected to software application 120 over bus 118, which is a conventional bidirectional bus. Software application 120 operates on one or more processors (or hardware assist devices, such as a field-programmable gate array (FPGA) or application-specific integrated circuit (ASIC)) to receive control messages, voice, and/or data from MAC 112 and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Figure 3:
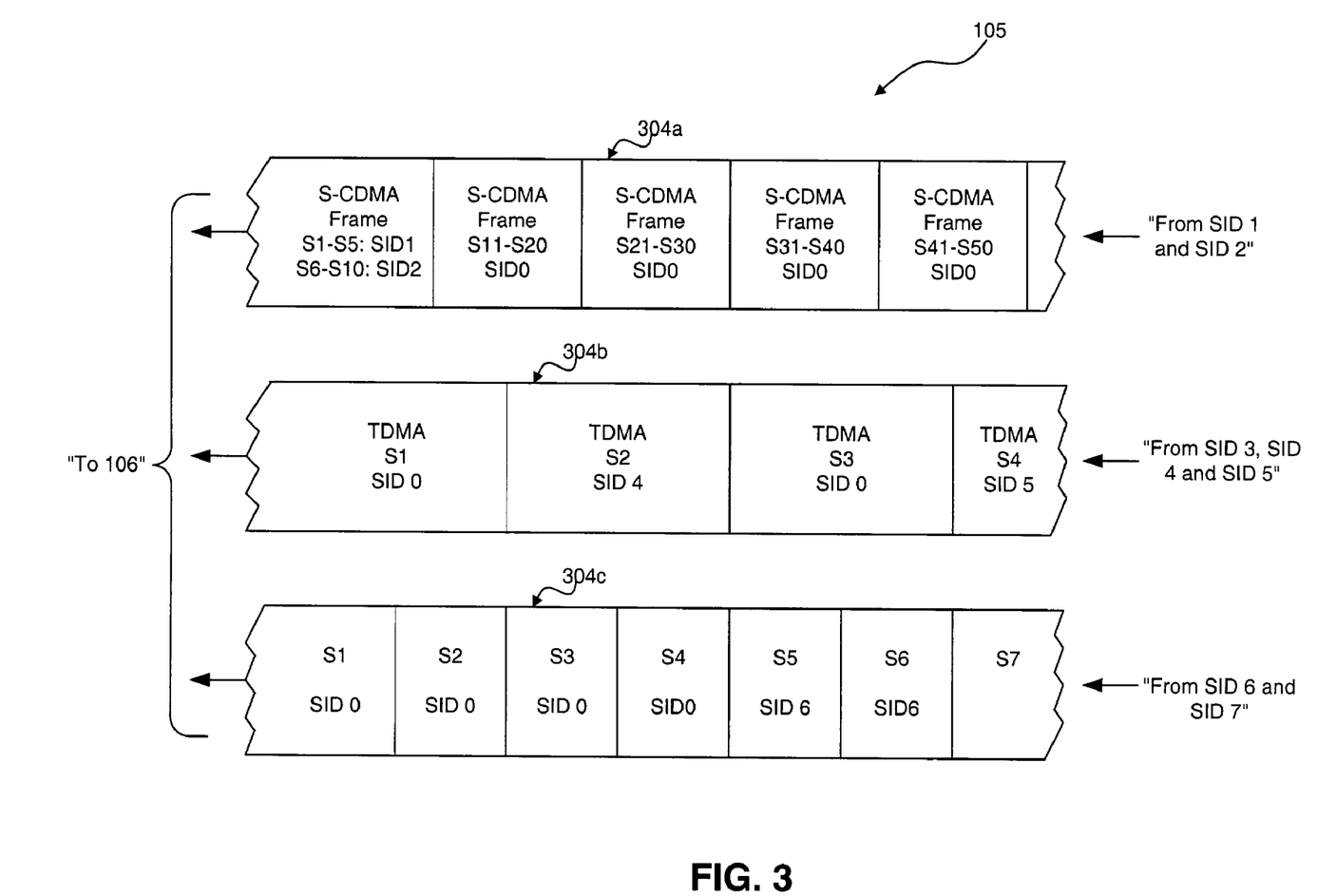
FIG. 3 illustrates upstream channels of a physical spectrum according to an embodiment of the present invention.

Similarly, upstream channel 304b enables upstream communications from one or more remote communications nodes 102 that have been assigned SID 3, SID 4, and SID 5 identifiers. Finally, upstream channel 304c enables upstream communications from one or more remote communications node 102 that has been assigned SID 6 and SID 7 identifiers. As such, system 100 enables the construction of logical channels that can be assigned to distinct remote communications nodes 102 having comparable upstream operating characteristics.

As discussed, in an embodiment, supervisory communications node 106 constructs a UCD message to define an upstream channel (e.g., channels 204a-204n or 304a-304c). The UCD specifies operating characteristics, such as the transmission modulation and/or multiple access standard for the designated upstream channel. In an embodiment, a UCD is prepared to configure remote communications node 102 to communicate using time division multiple access (TDMA) burst signals. In another embodiment, a UCD is prepared to configure remote communications node 102 to communicate using synchronous code division multiple access (S-CDMA) "frames."

Referring to FIG. 3, upstream channel 304a is partitioned into multiple S-CDMA frames, with each frame having multiple minislots (e.g., S1, S2, S3, etc.) that are assigned to a designated SID identifier(s). As shown, each frame contains ten minislots. It should be understood that ten minislots have been chosen for illustrative purposes, and more or less minislots can be used in accordance with network requirements. Nonetheless, the first five minislots (i.e., S1-S5) are assigned to SID 1. The second five minislots (i.e., S6-S10) are assigned to SID 2. The remaining S-CDMA frames shown on upstream channel 304a are assigned to SID 0, which is described in greater detail below.

Upstream channel 304b is partitioned into multiple TDMA minislots (e.g., S1, S2, S3, etc.) with each TDMA minislot being assigned to a designated SID identifier. Upstream channel 304c is partitioned according to a third type of multiple access scheme. Hence, it should be understood that the present invention is not limited to TDMA and/or S-CDMA modulation. The upstream channels of the present invention can be configured to support other transmission modulation and/or multiple access standards, including, but not limited to, advanced TDMA (A-TDMA), wave division multiplexing (WDM), dense wave division multiplexing (DWDM), frequency division multiple access (FDMA), and/or orthogonal FDMA (O-FDMA).

As discussed, each upstream channel is partitioned into distinct slots (i.e., denoted as S1, S2, S3, etc.) that remote communications nodes 102 utilize to transmit various types of upstream bursts. A slot count value (i.e., S"1", S"2", S"3", etc.) denotes each individual slot. In addition to partitioning the upstream into slots, the UCD message also stipulates the slot structure (also called slot duration). The slot structure represents the granularity of bandwidth allocation. In an embodiment, the slot structure is defined as a minislot as specified in the DOCSIS™ standards for TDMA transmissions. As such, the slot structure is based on the quantity of ticks per minislot. A tick is 6.25 microseconds (μs) as stipulated by the DOCSIS™ standards. In another embodiment, the slot structure is defined per the DOCSIS™ standards for S-CDMA transmissions as multiple minislots within a S-CDMA frame. The slot structure can be based on other units of measurements, including without limitation, bits, bytes, symbols, baud, characters, or like metrics for apportioning bandwidth.

In addition to the transmission modulation standard, the UCD message defines other upstream operating characteristics or physical parameters, such as symbol rate, center frequency, FEC parameters to be used for various burst types, preamble length, and/or the like. Accordingly, supervisory communications node 106 prepares different UCD messages with different channel ID fields to setup logical channels. The UCD messages are established to have different operating characteristics for each "logical channel" within the physical spectrum of internodal infrastructure 105. The different logical channels can overlap in frequency, however, as long as the different channels do not overlap in time.

Upon configuring the upstream operating characteristics, supervisory communications node 106 assigns the available slots (e.g., S1, S2, S3, etc.) to remote communications nodes 102. In an embodiment, a MAP message is prepared and transmitted to all remote communications nodes 102 to assign bandwidth (i.e., using SID identifiers as described above). In an embodiment, time multiplexing is implemented to ensure that the MAP messages for each channel are constructed such that only one of the time-multiplexed channels is scheduled to transmit at any given time. When one logical channel is transmitting, MAP messages (i.e., grants to a designated SID) for the other channels contain "null SID" grants, during which no remote communications node 102 on that channel can transmit.

In other words, the logical channel structure of internodal infrastructure 105 is completely transparent to each remote communications node 102. This means that a single remote communications node 102 uses a single channel ID to look for UCD messages and MAP messages from the downstream. Each remote communications node 102 processes and implements the instructions in these messages in the same manner with no knowledge of whether the channel ID it is using represents a logical channel which shares its physical spectrum with other logical channels. Thus, software application 120 creates separate UCD messages for each logical channel, and maps the channels so that only one logical channel is "active" at a time on the same physical spectrum.

This can be explained with reference to FIG. 3. As shown, MAP messages for each upstream channel 304a-304c are filled with grants to the null SID (i.e., SID 0) during the time that another upstream channel 304a-304c is "active" (i.e., has slots granted to a SID other than 0). For example, S-CDMA frame containing minislots S1-S5 and S6-S10 are granted to SID 1 and SID 2, respectively. At the time of this grant, only upstream channel 304a is active. Upstream channels 304b-304c are inactive as indicated by the grant to the null SID. Upstream channel 304b becomes active at TDMA minislot S2. As a result, upstream channels 304a and 304c are inactive during the time of transmitting TDMA minislot S2. Therefore, the upstream channels 304a-304c are multiplexed to prevent the channels from overlapping in time.

It should be noted that the beginning and/or end of the slots in each logical channel (e.g., upstream channels 304a-304c) do not need to be aligned with respect to each other. As such, some channels can have active or inactive sub-regions, with the inactive regions being defined by null SIDs, for carrying upstream information, as described below.

III. Operational Flow for Supplying MAPs to Burst Receiver

The present invention provides the ability for a single burst receiver (i.e., US PHY 108) communicating with a single physical interface in MAC 112 to receive bursts from multiple logical channels on a single segment of physical spectrum of the transmission medium (i.e., internodal infrastructure 105). This is provided by having MAC 112 parse MAP messages from all logical channels sharing the physical channel of internodal infrastructure 105, combine information from the various MAP messages into a single time-ordered stream, and send the time-ordered stream to US PHY 108 to enable it anticipate the next incoming burst.

Figure 4:
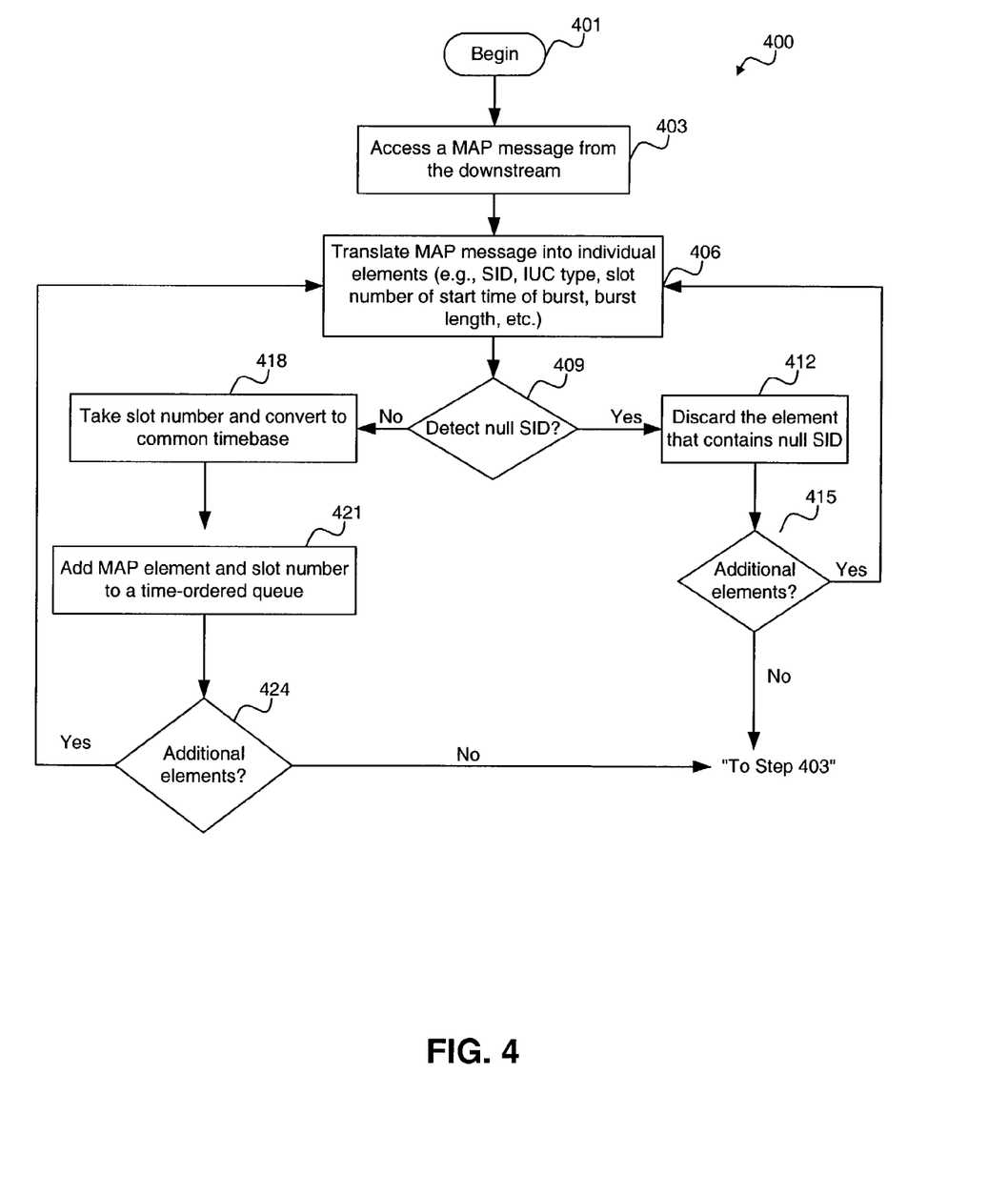
FIG. 4 illustrates an operational flow for assembling MAP messages in a time-ordered stream according to an embodiment of the present invention.

Referring to FIG. 4, flowchart 400 represents the general operational flow of an embodiment of the present invention. More specifically, flowchart 400 shows an example of a control flow for assembling MAP messages into an time-ordered queue for subsequent delivery to an upstream burst receiver.

The control flow of flowchart 400 begins at step 401 and passes immediately to step 403. At step 403, a MAP message is accessed from the downstream. In embodiment, software application 120 prepares MAP messages, and MAC 112 sends the MAP messages to remote communications nodes 102 via the downstream path of MAC 112. MAC 112 "sniffs" its downstream path to automatically extract MAP messages.

At step 406, each MAP message is parsed and translated to recover the individual elements, each of which describes a burst to be received. The incoming burst individual elements include, for example, the SID that will be transmitting, the interval usage code (IUC) of the burst that will be received, the slot number of the start time of burst, and the length of the burst, etc.

At step 409, the extracted individual elements from the MAP message are evaluated to detect the presence of a null SID. If a null SID is detected, control passes to step 412. Otherwise, control passes to step 418.

At step 412, the individual elements having a null SID are discarded. As discussed, logical channel structure is created by providing separate UCD messages for each logical channel, and mapping each logical channel so that only one logical channel is "active" at a time on the same physical spectrum of internodal infrastructure 105. This is accomplished by filling the MAP messages for each logical channel with grants to the null SID (i.e., SID 0) during the time that another channel is "active" (i.e., the channel has slots granted to a SID other than the null SID). When parsing the MAP messages, the present invention only retains the MAP messages for the channel that is "active" at any given time. Accordingly, the null SID grants representing inactive time on the various channels are removed.

At step 415, the MAP message (translated at step 406) is checked to determine if all extracted individual elements have been processed. If more individual elements are found, control returns to step 406 and step 409 is repeated. Otherwise, control returns to step 403 and the next MAP message from the downstream is processed.

At step 418, the slot number for the extracted individual element is converted to a common timebase. MAP messages use a slot numbering scheme to indicate when a MAP (or a grant) begins, and the slot numbering is completely independent across the logical channels, especially if one or more is an S-CDMA channel (e.g., upstream channel 304a). Therefore, the slot numbers for each logical channel are converted to a common timebase before attempting to compare start times of the MAP elements for ordering across channels. In an embodiment, timestamp counts are used as the common timebase. As such, slot counts of MAP messages, sub-regions within MAP messages, or grants, as needed, are converted to the corresponding timestamp count.

At step 421, the individual elements from MAP messages having active grants for the multiple logical channels are combined into a single time-ordered stream. The ordering logic is implemented by checking start times of the MAP individual elements. As discussed, the start time is the common timebase provided at step 418. Thus, the present invention parses MAP messages from different channels and puts them in time order before sending them to US PHY 108, even though the channels may use different numbering schemes to mark time divisions.

At step 424, the MAP message (translated at step 406) is checked to determine if all extracted individual elements have been processed. If more individual elements are found, control returns to step 406 and step 409 is repeated. Otherwise, control returns to step 403 and the next MAP message from the downstream is processed. Should no additional MAP messages are found to be available the control flow ends.

Figure 5:
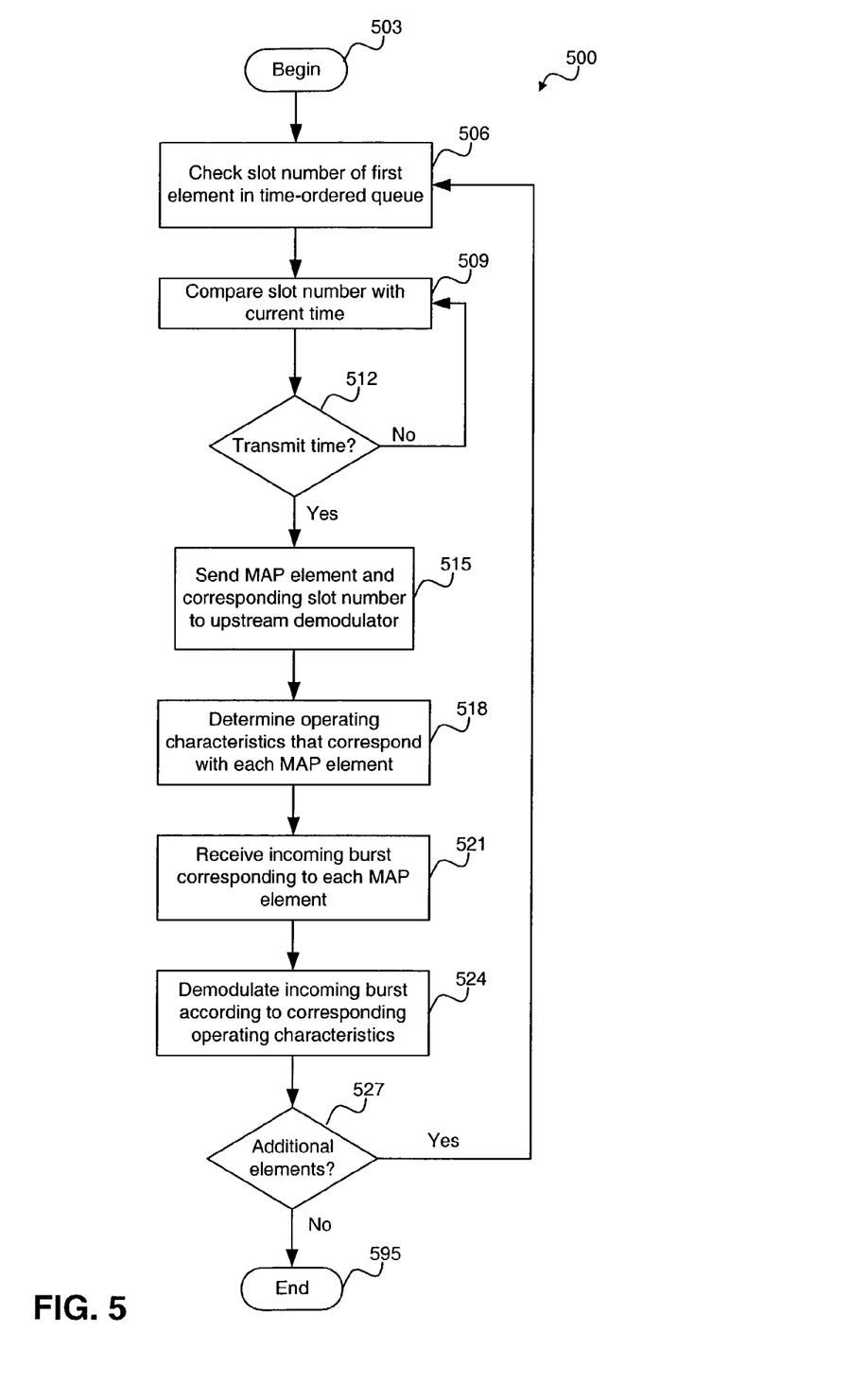
FIG. 5 illustrates an operational flow for supplying MAP messages to an upstream demodulator according to an embodiment of the present invention.

Referring to FIG. 5, flowchart 500 represents the general operational flow for supplying MAP information to an upstream burst receiver. More specifically, flowchart 500 shows an example of a control flow for emptying an time-ordered queue to deliver MAP individual elements to an upstream burst receiver in time to receive an incoming burst.

The control flow of flowchart 500 begins at step 503 and passes immediately to step 506. At step 506, the slot number for the first MAP individual element is checked. At step 509, the slot number is compared to the current time, which is also based on the common timebase used to prepare the slot number.

At step 512, it is determined whether it is time to transmit the individual element to the burst receiver. In other words, the individual elements are held until a prescribed time before the elements are forwarded. The elements are held because the MAP messages for the multiple logical channels are not necessarily parsed and queued (as represented by steps 403-424 of FIG. 4) in chronological order. Therefore, it is likely that, for example, a MAP message for logical channel 0 (e.g., upstream channel 304a) could arrive which contains an active region followed by an inactive region followed by another active region, and then later a MAP message could arrive for logical channel 1 (e.g., upstream channel 304b) containing an active region which "fills in" the inactive section of the channel 0 MAP message. Therefore, it is important to avoid sending MAP information to US PHY 108 too soon, so that no MAP messages for other logical channels will arrive later and invalidate the MAP information already sent.

The present invention overcomes this challenge by not sending the MAP information about a burst to the burst receiver (e.g., US PHY 108) until a prescribed time. In an embodiment, the prescribed time for each burst is 200 microseconds or less before that burst is scheduled to begin. According to the DOCSIS™ standards, 200 microseconds is the minimum MAP lead time at a cable modem. Therefore, software application 120 must transmit the MAP messages through MAC 112 more than 200 microseconds in advance. The prescribed time can be increased or decreased to account for plant distances and other system parameters. After the prescribed time is reached, control passes to step 515.

At step 515, the MAP individual element (with its corresponding slot number) is sent to the burst receiver (e.g., US PHY 108). Each MAP individual element is transferred to US PHY 108 immediately before the time the incoming burst it describes is to begin. Because the MAP individual elements are delivered in time order, US PHY 108 is able to know what to receive and when to receive it, without additional storage or complexity, and/or without duplication of silicon to provide a separate US PHY 108 for each logical channel (as would be necessary for a conventional system).

At step 518, US PHY 108 determines operating characteristics that correspond with each MAP individual element. At step 521, US PHY 108 receives the incoming burst corresponding to each MAP individual element. At step 524, US PHY 108 demodulates the incoming burst according to the corresponding operating characteristics. US PHY 108 contains multiple sets of channel parameters (one set for each logical channel) and chooses which set to use based on an indication from MAC 112 as to which logical channel a burst is being received on.

At step 527, the time-ordered queue is checked to determine if additional individual elements are available. If found, control returns to step 506 and steps 506-527 are repeated. Otherwise, the control flow ends as indicated by step 595. IV. System Implementation of Mapping Logical Channels Referring back to FIG. 1, in an embodiment, MAC 112 is an integrated circuit within a CMTS (shown in FIG. 1 as supervisory communications node 106). Accordingly, MAC 112 performs a variety of protocol processes defined by the CableLabs® Certified™ Cable Modem project (formerly known as Data Over Cable Service Interface Specification (DOCSIS™)). The DOCSIS™ protocol processing includes interfacing with US PHY 108 and DS PHY 110, encrypting and decrypting data, storing packet data in queues, and/or DMA functions to exchange data with memory 114. Although the present invention is described with reference to DOCSIS™ protocol processing, it should be understood that the present invention is intended to be inclusive of other types of communication protocols governing multimedia distribution networks.

Figure 6:
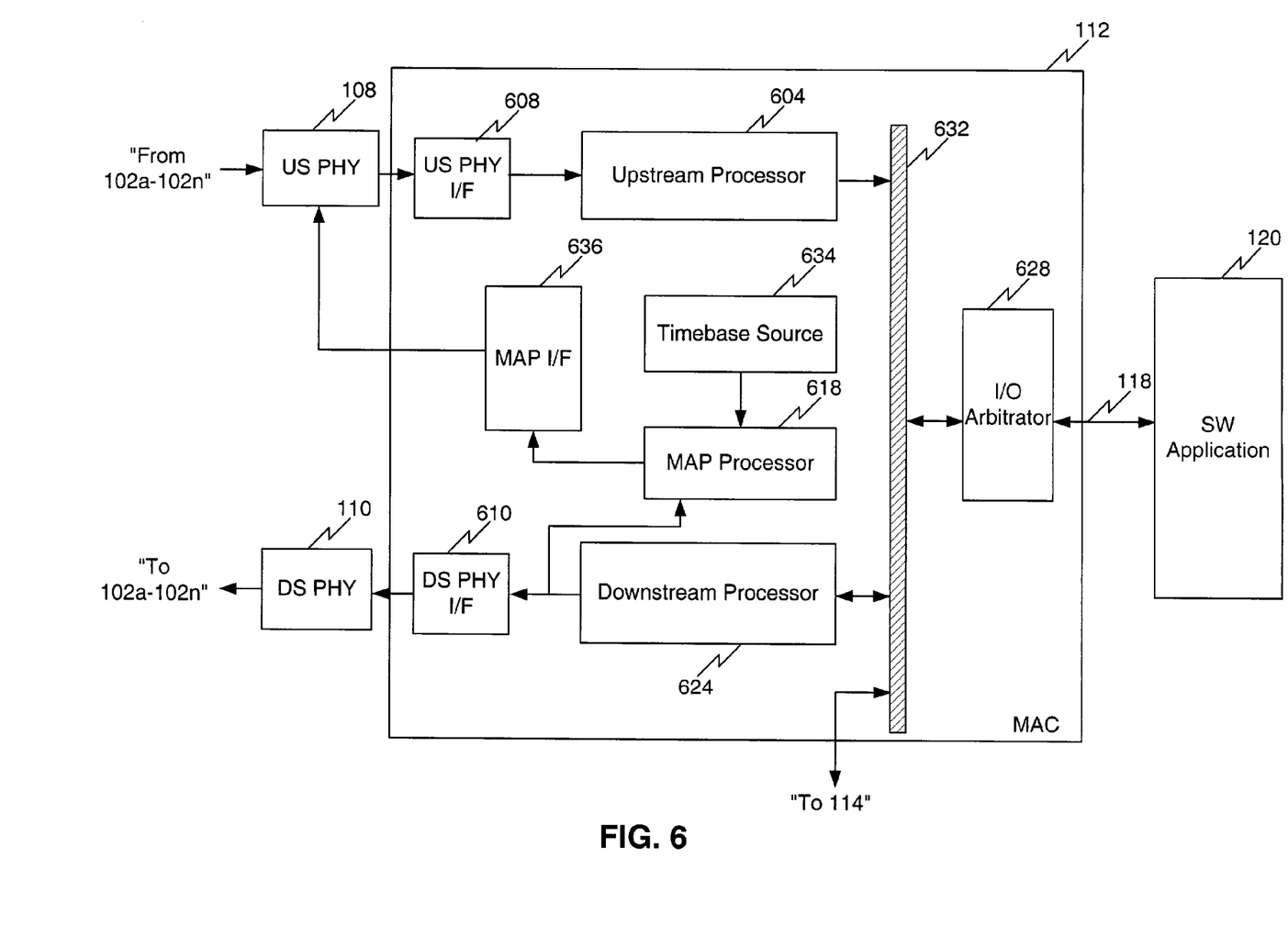
FIG. 6 illustrates a media access controller according to an embodiment of the present invention.

FIG. 6 shows the components of MAC 112 according to an embodiment of the present invention. MAC 112 includes an upstream PHY interface (US PHY I/F) 608, a downstream PHY interface (DS PHY I/F) 610, an upstream processor 604, a MAP processor 618, a downstream processor 624, an input/output (I/O) arbitrator 628, a timebase source 634, and a MAP interface (I/F) 636. The MAC components communicate over bus 632. In an embodiment, bus 632 is an internal-only split transaction bus with built-in arbitration to allow the components to communicate with each other with a shared memory interface to memory 114.

US PHY I/F 608 receives signals (including voice, data, bandwidth requests, and/or the like) from US PHY 108 and delivers them to upstream processor 604. Upstream processor 604 processes the signals according to DOCSIS protocols. Upon completion, upstream processor 604 forwards the signals to a queue for further processing. The queues are located in memory 114.

Bus 632 supports the transfer of signals among upstream processor 604, memory 114, and I/O arbitrator 628. I/O arbitrator 628 manages the flow of signals between MAC 112 and software application 120. Particularly, I/O arbitrator 628 interfaces with bus 118 to deliver the signals to software application 120. I/O arbitrator 628 also receives signals from software application 120. Such signals include broadcast signals, control messages (e.g., UCD, MAP messages, etc.), and/or the like to be transported downstream. These signals are typically stored in memory 114 until MAC 112 is ready to process them.

Downstream processor 624 interacts with bus 632 to receive the downstream signals from memory 114. Downstream processor 624 formats and prepares the signals for delivery to DS PHY I/F 610. If MAP messages are embedded in the signals, MAP processor 618 detects or extracts the MAP messages from the downstream path from downstream processor 624. As described above, MAP processor 618 puts elements from the MAP messages for multiple logical channels (e.g., upstream channels 204*a*-204*n*, or upstream channels 304*a*-304*c*) into a single time-ordered stream.

MAP processor 618 receives and formats the MAP messages to be transmitted to MAP I/F 636. In an embodiment, MAP processor 618 sends the entire the MAP message to MAP I/F 636. In another embodiment, MAP processor 618 translates the MAP messages to identify or specify individual elements, such as the SID, IUC, length, slot number, and/or slot offset for each incoming burst. As such, only this data is sent to MAP I/F 636. As a MAP message is forwarded, MAP processor 618 receives a timebase reference from timebase source 634. Timebase source 634 provides a timebase reference that informs the other components of the current time. Timebase source 634 also provides a timebase reference that enables MAP processor 618 to convert the slot number (of the start time of a MAP individual element) to a common timebase, as described above.

MAP I/F 636 receives the MAP message (or individual elements from the MAP message) from MAP processor 618. MAP I/F 636 forwards the MAP message to US PHY 108, which uses the information to anticipate and demodulate the next upstream burst from remote communications nodes 102*a*-102*n*.

Figure 7:
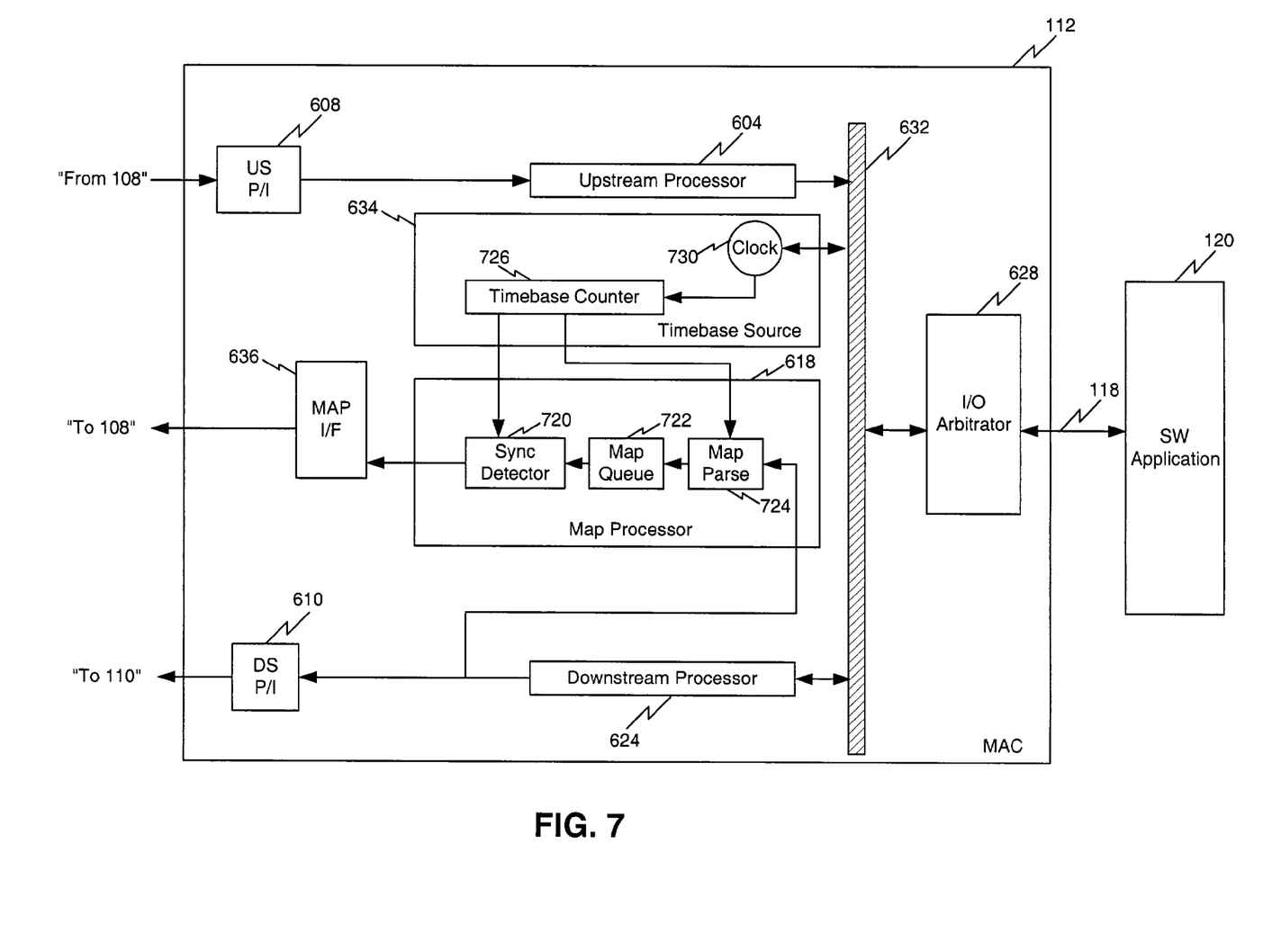
FIG. 7 illustrates a media access controller according to another embodiment of the present invention.

FIG. 7 illustrates another embodiment of MAP processor 618 and timebase source 634 according to the present invention. MAP processor 618 includes a synch detector 720, a MAP queue 722, and a MAP parse 724. MAP parse 724 listens to the downstream from downstream processor 624 to receive MAP messages that are to be broadcast to the downstream remote communications nodes 102. MAP parse 724 enables a duplicate of the MAP messages to be provided to US PHY 108. As discussed above, US PHY 108 uses the MAP messages to anticipate the arrival of upstream bursts.

As shown in FIG. 7, MAP parse 724 receives a timebase reference from timebase source 634. The timebase reference is used to convert the slot number of the start time of each individual element to a common timebase, as described above. MAP parse 724 forwards to MAP queue 722 the MAP messages destined for US PHY 108.

MAP queue 722 provides a time-ordered queue for the logical channels, as described above. Thus, the MAP messages are queued in MAP queue 722 for the designated upstream channels that share a single burst receiver (i.e., US PHY 108).

The MAP messages are subsequently delivered to sync detector 720, which forwards the MAP messages (or individual elements from the MAP messages) to MAP I/F 636. Sync detector 720 compares the slot number for each individual element to the current time received from timebase source 634. As described above, at a prescribed time (e.g., 200 microseconds before the burst is scheduled to begin), sync detector 720 forwards the individual element to MAP I/F 636. The current time from timebase source 634 is also passed to MAP I/F 636.

As shown in FIG. 7, timebase source 634 includes a clock 730 and a timebase counter 726. Clock 730 is a conventional clock that is initialized and/or periodically updated by software application 120. Clock 730 pulses timebase counter 726, and enables timebase counter 726 to increment.

Timebase counter 726 generates the timebase reference used to convert slot numbers detected in the MAP elements to a common timebase. Timebase counter 726 also provides timebase reference signals to other components (e.g., sync detector 720, MAP parse 724, etc.) to state the current time.

MAP I/F 636 receives the MAP elements (with the corresponding slot numbers) from sync detector 720. As discussed above with reference to FIG. 6, MAP I/F 636 forwards this information to US PHY 108, so that US PHY 108 can plan for incoming upstream bursts.

In an embodiment, the components US PHY 108, US PHY I/F 608, and MAC 112 are provided as separate integrated circuits. However, the present invention is not limited to such partitioning, in which US PHY 108, US PHY I/F 608, and MAC 112 are separate integrated circuits. In another embodiment, US PHY 108, US PHY I/F 608, and MAC 112 (or any combination thereof) are integrated into a single chip. In another embodiment, the MAP parsing functions of MAC 112 are integrated into US PHY 108. In another embodiment, the MAP parsing functions of MAC 112 are integrated into other components of MAC 112 and/or supervisory communications node 106, including without limitation software application 120. In other words, the functions of putting MAP elements in time order across logical channels, indicating to which logical channel each burst belongs, and choosing accordingly from several sets of channel parameters when receiving the burst can be implemented by any of the components or sub-components of supervisory communications node 106.

Since the present invention enables a single burst receiver (e.g., US PHY 108) of a single MAC (e.g., MAC 112) to handle multiple logical channels, cost savings can be realized by not having to fabricate a communications system (e.g., supervisory communications node 106) with multiple burst receivers. The increase in density also reduces the power consumption requirements since less burst receivers are needed. As such, the present invention provides a cost-effective solution for enabling multiple logical channels to share a common physical spectrum.

V. Exemplary System Implementation

FIGS. 1-7 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 8:
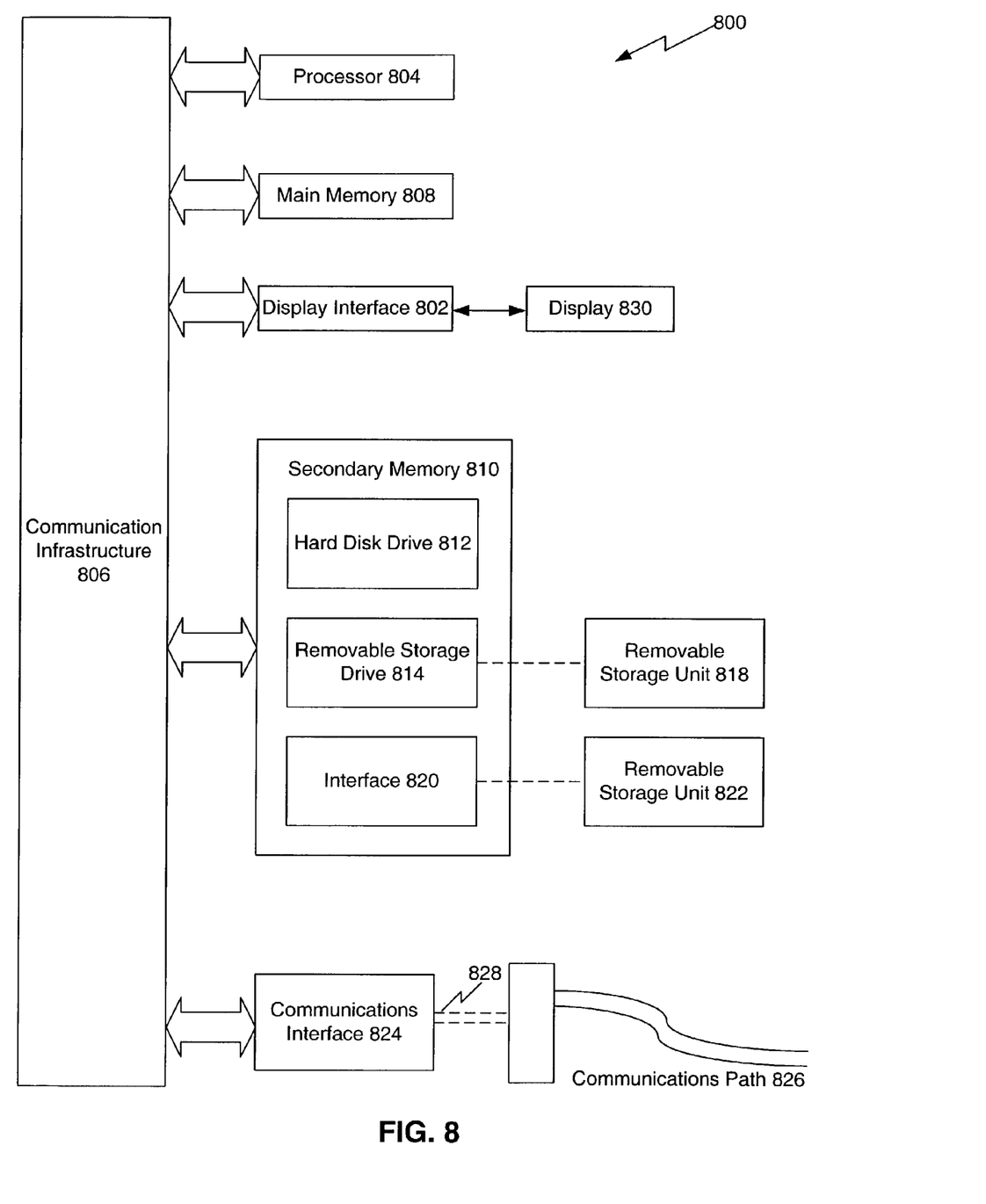
FIG. 8 illustrates an example computer system useful for implementing the present invention.

The present invention can be implemented in one or more computer systems capable of carrying out the functionality described herein. Referring to FIG. 8, an example computer system 800 useful in implementing the present invention is shown. Various embodiments of the invention are described in terms of this example computer system 800. After reading this description, it will become apparent to one skilled in the relevant art(s) how to implement the invention using other computer systems and/or computer architectures.

The computer system 800 includes one or more processors, such as processor 804. Processor 804 can be a special purpose or a general purpose digital signal processor. Processor 804 is connected to a communication infrastructure 806 (e.g., a communications bus, crossover bar, or network). Various software implementations are described in terms of this exemplary computer system. After reading this description, it will become apparent to a one skilled in the relevant art(s) how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818 represents a floppy disk, magnetic tape, optical disk, etc. As will be appreciated, the removable storage unit 818 includes a computer usable storage medium having stored therein computer software (e.g., programs or other instructions) and/or data.

In alternative implementations, secondary memory 810 includes other similar means for allowing computer software and/or data to be loaded into computer system 800. Such means include, for example, a removable storage unit 822 and an interface 820. Examples of such means include a program cartridge and cartridge interface (such as that found in video game devices), a removable memory chip (such as, an EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and/or data to be transferred between computer system 800 and external devices. Examples of communications interface 824 include a modem, a network interface (such as an Ethernet card), a communications port, a PCMCIA slot and card, etc. Software and data transferred via communications interface 824 are in the form of signals 828 which can be electronic, electromagnetic, optical, or other signals capable of being received by communications interface 824. These signals 828 are provided to communications interface 824 via a communications path (i.e., channel) 826. Communications path 826 carries signals 828 and can be implemented using wire or cable, fiber optics, a phone line, a cellular phone link, an RF link, free-space optics, and/or other communications channels.

In this document, the terms "computer program medium" and "computer usable medium" are used to generally refer to media such as removable storage unit 818, removable storage unit 822, a hard disk installed in hard disk drive 812, and signals 828. These computer program products are means for providing software to computer system 800. The invention, in an embodiment, is directed to such computer program products.

Computer programs (also called computer control logic or computer readable program code) are stored in main memory 808 and/or secondary memory 810. Computer programs can also be received via communications interface 824. Such computer programs, when executed, enable the computer system 800 to implement the present invention as discussed herein. In particular, the computer programs, when executed, enable the processor 804 to implement the processes of the present invention, such as the method(s) implemented using MAP processor 618 and/or timebase source 634 described above, such as methods 400, and/or 500, for example. Accordingly, such computer programs represent controllers of the computer system 800.

In an embodiment where the invention is implemented using software, the software can be stored in a computer program product and loaded into computer system 800 using removable storage drive 814, hard drive 812, interface 820, or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems, set-top boxes, and headends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A method for supplying MAP messages to a single upstream demodulator, said single upstream demodulator operable to anticipate upstream burst arrivals, comprising the steps of:

sending one or more MAP messages via a downstream by a media access controller (MAC) included within a cable modem termination system (CMTS);

extracting said one or more MAP messages from said downstream by said MAC;

translating said one or more MAP messages by said MAC into individual elements, wherein each individual element corresponds to an incoming burst, wherein each of said individual elements comprises a SID;

adding said individual elements to a time-ordered queue in said MAC;

sending said individual elements from said time-ordered queue to said single upstream demodulator, wherein said individual elements are sent in chronological order according to placement in said time-ordered queue; and determining upstream operating characteristics by said single upstream demodulator corresponding to each of said individual elements, wherein at least two of said individual elements correspond to different logical upstream channels, each logical upstream channel having different operating characteristics and being received at said single upstream demodulator.

2. The method of claim 1, further comprising the steps of:
accessing said incoming burst corresponding to one of said individual elements; and
demodulating said incoming burst according to said upstream operating characteristics.

3. The method of claim 1, wherein said adding step comprises the steps of:
adding an individual element to said time-ordered queue in response to not detecting a null SID in said individual element; and
discarding an individual element in response to detecting a null SID in said individual element.

4. The method of claim 1, further comprising the step of:
converting a slot number accessed from said individual element to a common timebase, wherein said slot number specifies a start time of the incoming burst corresponding to said individual element; and
sending said individual element to said single upstream demodulator at a prescribed time reference with respect to said slot number.

5. The method of claim 1, wherein each of said individual elements further comprises an IUC type, a start time of a corresponding incoming burst, and/or a length of said corresponding incoming burst.

6. The method of claim 1, wherein said upstream operating characteristics comprise a symbol rate, a center frequency, FEC parameters for an incoming burst type, and/or a transmission modulation standard.

7. The method of claim 6, wherein said transmission modulation standard is time division multiple access.

8. The method of claim 6, wherein said transmission modulation standard is synchronous code division multiple access.

* * * * *